July 20, 1937.  F. A. SEEDLOCK  2,087,484

FILE

Filed Aug. 6, 1936

INVENTOR.
Frank A. Seedlock
BY
ATTORNEY.

Patented July 20, 1937

2,087,484

UNITED STATES PATENT OFFICE 2,087,484

FILE

Frank A. Seedlock, Lakewood, Ohio, assignor to The Nolvex File Company, Cleveland, Ohio, a corporation of Ohio Application August 6, 1936, Serial No. 94,570

3 Claims. (Cl. 29—78)

This invention relates to files and has for its object to provide an improved form of tooth and groove or gullet which is especially adapted for files having flat working surfaces and preferably for files of this type wherein the teeth are in the form of concentric segments or arcs the centers of which coincide with the axis of the file. While files of this general type are well known and have gone into extensive use, when operated on soft metal such as lead or semi-hard metal such as machine steel, the grooves or gullets between the teeth are liable to become clogged by the adherence of the metal thereto, with the result that time is lost in removing the metal which has thus accumulated.

It is the general object of my invention to so construct a file of the character referred to as to render it self-clearing when used in connection with soft or semi-hard metal. A further object of the invention is to prolong the lives of files of this character.

Figure 1:
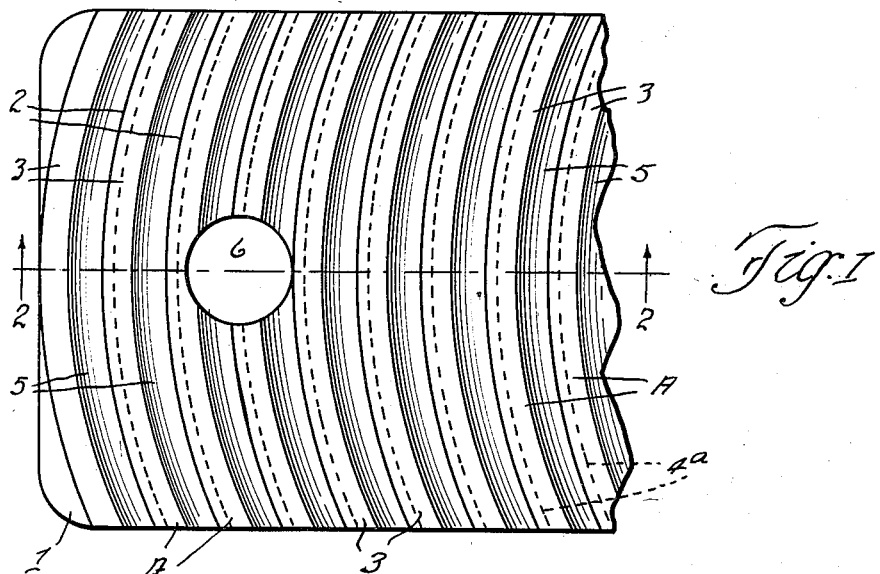
Figure 2:
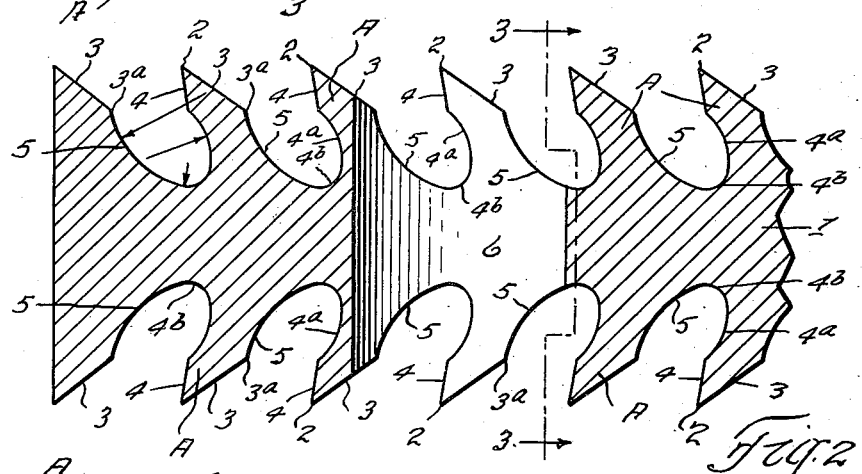
Figure 3:
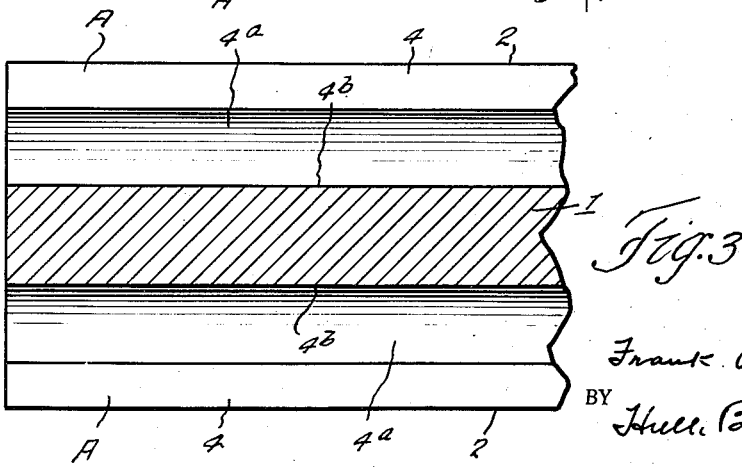

I accomplish the foregoing objects by the construction illustrated in the drawing, wherein Fig. 1 represents a plan view of a portion of a file constructed in accordance with my invention; Fig. 2 a detail in section corresponding to the line 2—2 of Fig. 1; and Fig. 3 a detail in section corresponding to the line 3—3 of Fig. 2.

Describing by reference characters the parts shown in the drawing, 1 denotes the body of the file, the same being shown as one of the "flat" type having its opposite faces provided with teeth. Each tooth, indicated generally at A, is provided with a cutting edge 2, the cutting edges of the teeth being in the form of arcs or segments extending entirely across the working faces of the file, the radii of the cutting edges being equal and the centers coincident with the axis of the file. At the rear of the cutting edge, each tooth is provided with a relief face 3 sloping rearwardly toward the center of the file body. Each tooth is also provided with a front rake face comprising a plane portion 4 extending toward the body of the file from the cutting edge and at about an angle of 3½° to a plane perpendicular to the axis. This portion merges with a forwardly concave surface $4^a$ which in turn extends nearly to the bottom of the groove or gullet formed between adjacent teeth, the bottom of the groove or gullet being upwardly concave as shown at $4^b$, the concave surface $4^b$ in turn merging with an upwardly and rearwardly concave surface 5 which extends to the rear edge $3^a$ of each relief face 3.

It will be noted that the radii of curvature of the surfaces or walls $4^a$, $4^b$ and 5 are different in length. The radius of curvature of the wall $4^b$ is the shortest; the radius of curvature of the wall $4^a$ is considerably longer than that of the wall $4^b$; while the radius of curvature of the wall 5 is considerably longer than the radius of curvature of the wall $4^a$.

Due to this peculiar shape of the gullets or lands formed between the teeth, soft or semi-hard material dislodged by the cutting edges of the teeth will first strike the curved walls 5 and be deflected thereby to the bottoms of the grooves or gullets. When the walls $4^a$ are straight, constituting plane extensions of the walls 4, the metal thus deflected to the bottoms of the grooves or gullets will adhere to the grooves or gullets and particularly to the bottoms and the rear sides of the same. However, by forming the grooves or gullets with the concave walls $4^b$ and $4^a$ in addition to the concave wall 5, opportunity is afforded for the metal to roll into the concavity of the wall $4^b$, and partly up the concavity of the wall $4^a$; and this opportunity thus to roll will prevent the adhesion of the metal to the grooves or gullets and thus render the file self-clearing, even when operated upon metals which will clog all other makes of files of this type with which I am familiar.

It will be noted that the width of each tooth along lines parallel with its relief face is substantially equal to the width of the relief face, down to and even beyond the bottom of its rake face. It will be evident that, due to this construction, it is possible to sharpen files of the character shown and described herein far more frequently than is possible with any other type of file with which I am familiar. In fact, should the re-sharpening be continued to a point somewhat below the bottom of each rake face 4, still further re-sharpenings may be made, the teeth in such case each being provided with a razor-like cutting edge, due to the curvature of the wall $4^a$. Furthermore, owing to the shape of the grooves or gullets which are formed between adjacent teeth, the width of the top of each gullet will be substantially unaffected by such successive resharpenings, thereby enabling a file constructed in accordance with my invention to combine the capacity for self-clearing referred to hereinbefore with a longevity which has been incapable of accomplishment by any other file with which I am familiar.

It will, therefore, be evident that, by constructing files in the manner shown and described herein, I am enabled, not only to prevent the clogging of the grooves or gullets but also to prolong materially the lives of the files.

The files may be provided at each end with an aperture 6 for the application thereto of a removable handle.

Having thus described my invention, what I claim is:

1. A file comprising a substantially flat body having teeth extending thereacross, each tooth having a forward cutting edge, a plane rake face extending toward the body from such cutting edge, and a relief face extending rearwardly and toward the body from such cutting edge, the grooves or gullets formed between adjacent teeth being uninterrupted and comprising each an upwardly concave wall at the bottom of said groove or gullet, an upwardly and rearwardly concave wall extending from the relief face of a front tooth and merging at its lower end with the first mentioned concave wall, and a forwardly concave wall merging at its bottom with the first mentioned concave wall and extending upwardly to the bottom of the plane rake face thereabove, the radius of curvature of the bottom of the said concave wall being shorter than the radius of curvature of each of the other concave walls and the radius of curvature of the second concave wall being materially longer than that of the third concave wall.

2. A file comprising a substantially flat body having teeth extending thereacross, each tooth having a forward cutting edge, a plane rake face extending toward the body from such cutting edge and a plane relief face extending rearwardly and toward the body from such cutting edge, the grooves or gullets formed between adjacent teeth comprising each an upwardly concave wall at the bottom of each groove or gullet extending upwardly along the back of the tooth in front thereof and to the bottom of the relief face of said tooth and also extending upwardly along the front face of the tooth at the rear of such groove or gullet and to the bottom of the rake face thereof, the width of each tooth, taken along lines substantially parallel with the relief face thereof and down to the bottom of the rake face thereof, being substantially equal to the width of such relief face.

3. A file comprising a substantially flat body having teeth extending thereacross, each tooth having a forward cutting edge, a plane rake face extending toward the body from such cutting edge and a plane relief face extending rearwardly and toward the body from such cutting edge, the grooves or gullets formed between adjacent teeth comprising each an upwardly concave wall at the bottom of each groove or gullet extending upwardly along the back of the tooth in front thereof and to the bottom of the relief face of said tooth and also extending upwardly along the front face of the tooth at the rear of such groove or gullet and to the bottom of the rake face thereof, the width of each tooth, taken along lines substantially parallel with the relief face thereof and down to the bottom of the rake face thereof, being substantially equal to the width of such relief face, the concavity of each groove or gullet being such that it will be of substantially the same width at the upper end thereof following each sharpening of the teeth of the file down to and across the bottoms of the rake faces thereof.

FRANK A. SEEDLOCK.